US007574271B2

(12) United States Patent
Steindl et al.

(10) Patent No.: US 7,574,271 B2
(45) Date of Patent: Aug. 11, 2009

(54) PASSENGER TRANSPORTATION SYSTEM ESPECIALLY AN ESCALATOR OR MOVING WALK

(75) Inventors: Gunter Steindl, Breitenfurt (AT); Josef Wiesinger, Vienna (AT); Gerhard Stoiber, Gosting (AT); Dirk Blondiau, Vienna (AT)

(73) Assignee: Inventio AG, Hergiswil (CH)

( * ) Notice: Subject to any disclaimer, the term of this patent is extended or adjusted under 35 U.S.C. 154(b) by 352 days.

(21) Appl. No.: 11/584,656

(22) Filed: Oct. 20, 2006

(65) Prior Publication Data

US 2007/0220329 A1 Sep. 20, 2007

(30) Foreign Application Priority Data

Oct. 21, 2005 (EP) ................................ 05109858

(51) Int. Cl.
*B66B 25/00* (2006.01)
*G05B 19/18* (2006.01)
*G05B 11/01* (2006.01)

(52) U.S. Cl. ............................ 700/21; 700/3; 198/322

(58) Field of Classification Search ................. 700/1-3, 700/9, 17-21, 75, 112, 113, 228, 230; 198/321, 198/322, 330, 570, 571, 577
See application file for complete search history.

(56) References Cited

U.S. PATENT DOCUMENTS

| | | | | |
|---|---|---|---|---|
| 4,495,573 | A * | 1/1985 | Ballegeer et al. | 710/110 |
| 4,520,275 | A * | 5/1985 | Marusik | 307/64 |
| 4,600,865 | A | 7/1986 | Caputo et al. | |
| 4,765,456 | A * | 8/1988 | Bower | 198/810.01 |
| 4,953,199 | A * | 8/1990 | Hoshi et al. | 379/93.11 |
| 5,086,964 | A * | 2/1992 | Blaser | 226/108 |
| 5,239,247 | A * | 8/1993 | Habig et al. | 318/568.18 |
| 5,249,140 | A * | 9/1993 | Kessler | 700/3 |
| 5,506,767 | A * | 4/1996 | Naylor | 700/11 |
| 5,506,965 | A * | 4/1996 | Naoe | 709/209 |
| 5,697,485 | A | 12/1997 | Abraham et al. | |
| 5,784,581 | A * | 7/1998 | Hannah | 710/110 |

(Continued)

FOREIGN PATENT DOCUMENTS

EP 0 780 337 B1 10/2003

(Continued)

*Primary Examiner*—M. N. Von Buhr
(74) *Attorney, Agent, or Firm*—Ladas & Parry LLP

(57) ABSTRACT

A passenger transportation system, such as an escalator or moving walk, contains a circulating band, a driving station, and a reversing station. The driving station is arranged in the area of a first end of the passenger transportation system and has a slave control unit. The reversing station in the area of a second end of the passenger transportation system has a master control unit. For the purpose of exchanging data, the master control unit and the slave control unit are connected together by a data bus. The slave control unit has a first printed circuit board on which is mounted a first set of electronic components and which serves to transmit to the master control unit data concerning the functioning of the passenger transportation system. The master control unit has a second printed circuit board on which is mounted a second set of electronic components and which serves to analyze the data and control of the passenger transportation system. The first and second boards are identically constructed and may have identical sets of electronic components.

10 Claims, 2 Drawing Sheets

U.S. PATENT DOCUMENTS

| | | | | | |
|---|---|---|---|---|---|
| 6,144,223 | A * | 11/2000 | Momtaz | 326/83 |
| 6,273,234 | B1 * | 8/2001 | Balzer-Apke et al. | 198/323 |
| 6,370,447 | B1 * | 4/2002 | Miyazaki | 700/230 |
| 6,717,455 | B2 * | 4/2004 | Mughal et al. | 327/378 |
| 6,778,526 | B1 * | 8/2004 | Brown et al. | 370/351 |
| 6,827,196 | B2 * | 12/2004 | Wiesinger et al. | 198/323 |
| 6,896,119 | B2 * | 5/2005 | Wiesinger et al. | 198/323 |
| 6,952,789 | B1 * | 10/2005 | Azim et al. | 713/400 |
| 6,988,607 | B2 * | 1/2006 | Blondiau et al. | 198/322 |
| 7,123,493 | B2 * | 10/2006 | Tanaka et al. | 363/65 |
| 7,212,884 | B2 * | 5/2007 | Kappelgaard et al. | 700/228 |
| 2003/0153988 | A1 | 8/2003 | Shepard et al. | |
| 2006/0123175 | A1 * | 6/2006 | Yu et al. | 710/305 |
| 2006/0195625 | A1 * | 8/2006 | Hesse | 710/8 |
| 2006/0282233 | A1 * | 12/2006 | Pasricha et al. | 703/1 |
| 2007/0104486 | A1 * | 5/2007 | Hiraka | 398/70 |
| 2008/0005256 | A1 * | 1/2008 | Shibayama et al. | 709/208 |

FOREIGN PATENT DOCUMENTS

| | | | |
|---|---|---|---|
| JP | 05056482 | A * | 3/1993 |
| JP | 05103082 | A * | 4/1993 |

* cited by examiner

PASSENGER TRANSPORTATION SYSTEM ESPECIALLY AN ESCALATOR OR MOVING WALK

The present invention relates to a passenger transportation system, especially an escalator or moving walk, with a circulating band, a driving station, and a reversing station.

BACKGROUND OF THE INVENTION

For the purpose of operating and monitoring conventional escalators, it is known to equip these with a control system that comprises a so-called slave control unit in the area of the driving station and a so-called master control unit in the area of the reversing station. From the definition as “master” or “slave” respectively, it is apparent that the slave control unit is primarily intended to collect, and transmit to the master control unit, data from the peripheral devices that are connected to the slave control unit such as, for example, sensors. The slave control unit is also designed to receive, and pass on to the peripheral devices, control commands that are issued by the master control unit in the form of control signals, by means of which, for example, a relay of a travel direction indicator that is connected to the slave control unit can be controlled. The master control unit is primarily used to receive the data transmitted by the slave control unit, to analyze the data, and to control the overall escalator, specifically to control the peripheral devices that are connected to the master control unit and to the slave control unit. These different functions and areas of application of the master control unit and the slave control unit inevitably result in different requirements for their components. This relates particularly to the printed circuit boards of the master control unit and of the slave control unit that carry electronic components, and proves to be particularly disadvantageous if slave control units with different requirements profiles are used. Particularly in relation to mass production of the printed circuit boards, the cost outlay is comparatively high.

The objective of the invention is to create a passenger transportation system in which, through standardization of the components of the control system, cost savings in the manufacture of these components can be achieved.

To fulfill this objective, a passenger transportation system according to the invention has a driving station arranged in the area of a first end of the passenger transportation system and has a slave control unit, while a reversing station is arranged in the area of a second end of the passenger transportation system and has a master control unit. For the purpose of exchanging data, the master control unit and the slave control unit are connected together by a data bus. The slave control unit also has a first printed circuit board on which is mounted a first set of electronic components and which serves to transmit to the master control unit data concerning the functioning of the passenger transportation system. The master control unit has a second printed circuit board on which is mounted a second set of electronic components and which serves to analyze the data and control of the passenger transportation system.

It is also possible for several slaves to be used in one escalator.

The position of the master is not restricted to the lower stairhead. In a system with an external control cabinet, the master is placed in the external control cabinet. One slave is placed in each of the lower and upper stairheads.

The invention is further characterized in that the first printed circuit board and the second printed circuit board are identically constructed. The passenger transportation system according to the invention is based on the idea that an identical printed circuit board can by used both for the slave control unit arranged, for example, in the driving station, and for the master control unit arranged, for example, in the reversing station. This simplifies manufacture of the printed circuit boards for the passenger transportation system, as a result of which a cost saving can be achieved. It also results in simplification of the construction of the master control unit and of the slave control unit, since no different printed circuit boards have to be used, with the result that confusion of the printed circuit boards can be ruled out. Repair measures are also simplified to the same degree, since erroneous replacement is no longer possible, and keeping different types of printed circuit board at the ready is no longer necessary. A particular advantage is that, when a replacement takes place, the operating data of the passenger transportation system can generally be loaded rapidly and by simple means onto a printed circuit board that is fitted with a memory unit, in that the data stored on the printed circuit board of the other control unit can be transmitted via the data bus onto the newly installed printed circuit board of the slave control unit. A further result is the creation of an additional safety measure.

A preferred embodiment consists of the first set of electronic components and the second set of electronic components being at least partially identically constructed. In other words, as well as the construction of the first and second printed circuit boards being identical, virtually all electronic components of the at least two printed circuit boards can also be identical so as to achieve a further standardization of the components of the control system of the passenger transportation system. This, in turn, allows manufacturing to be simplified, and costs to be saved. It can, for example, be arranged that a certain number of components in the first and second printed circuit boards are identically constructed, and mounted on the same connector positions of the identically constructed first and second printed circuit boards.

In a further preferred embodiment, the printed circuit boards are provided with a switch, the printed circuit boards being configurable as a master control unit or as a slave control unit depending on the position of the switch. This switch is preferably operated manually and on site, which means during an installation or repair.

It is expedient for the printed circuit boards to have a first optical display unit to display their configuration as a master control unit or as a slave control unit. In places that are difficult to see into, or are poorly lit, this simplifies recognition of the position of the switch and can also serve as an additional recognition means adjacent to the switch.

It is preferable for the printed circuit boards to have a second optical display unit to display data, especially error messages. Specifically, an LCD is used as display unit. This allows recognition of an error message or fault code even without connecting a diagnostic instrument such as, for example, a laptop computer. As well as error messages, other data such as, for example, the operational status, can also be displayed. The display unit can also serve as a real-time clock.

According to a further preferred embodiment, the printed circuit boards have at least one interface for connection of a peripheral device, specifically a laptop. Particularly with respect to maintenance purposes, this allows rapid identification of the cause of a fault. Furthermore, under certain circumstances it may be possible to correct the identified fault by software means using the connected laptop.

The slave control unit and/or the master control unit can be used to monitor the travel speed, the travel direction, the safety switch, and/or the braking distance of the band. As further functions of the passenger transportation system, the synchronous running of the handrails, the presence of steps or pallets, the functioning of the safety circuit, the contactor dropout control, and the functioning of light barriers can be monitored.

According to a further embodiment, the driving station has a drive unit, the master control unit transmitting a braking signal to the drive unit if the slave control unit or the master control unit detects a fault. It is also advantageous if, at predefined time intervals, the master control unit emits a validating signal to validate the functioning of the data bus.

BRIEF DESCRIPTION OF THE DRAWINGS

The invention is explained in greater detail below by reference to the drawings, wherein.

DETAILED DESCRIPTION OF THE INVENTION

Figure 1:
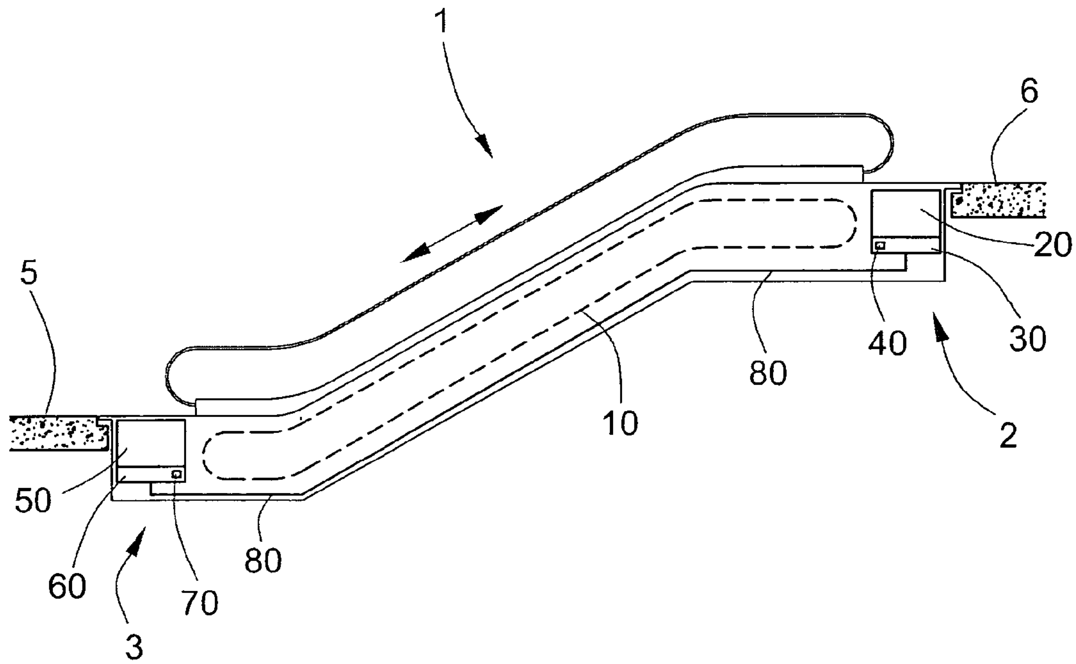
FIG. 1 is a diagrammatic longitudinal section through a passenger transportation system according to the invention in the form of an escalator.

FIG. 1 shows diagrammatically a passenger transportation system in the form of an escalator 1 with a circulating step band 10 for the transportation of persons from a first level 5 to a second level 6 or vice versa (see arrow).

In the area of a first end 2 in the area of the second level 6, the escalator 1 has a driving station 20 with a drive unit that comprises a motor and a drive shaft. Arranged in the area of a second end 3 of the escalator 1 in the area of the first level 5 is a reversing station 50. The driving station 20 has a slave control unit 30 with a first printed circuit board 40. The reversing station 50 contains a master unit 60 with a second printed circuit board 70. For the purpose of exchanging data, the slave control unit 30 and the master control unit 60 are connected together by a data bus in the form of a data conductor 80. The first printed circuit board 40 and the second printed circuit board 70 are identically constructed. In other words, the carrier boards of the printed circuit boards 40, 70 have identical patterns and provide for identical connections.

The components that are arranged on the first printed circuit board 40 and on the second printed circuit board 70 are described below by reference to FIG. 2. It should be noted that a difference between the printed circuit boards 40 and 70 can arise through the electronic components of the printed circuit boards 40, 70 being identical only in principle, meaning that there are more or less components on one of the printed circuit boards. Under certain circumstances it is therefore possible on one of the printed circuit boards 40, 70, for connection possibilities that are provided to remain free.

Figure 2:
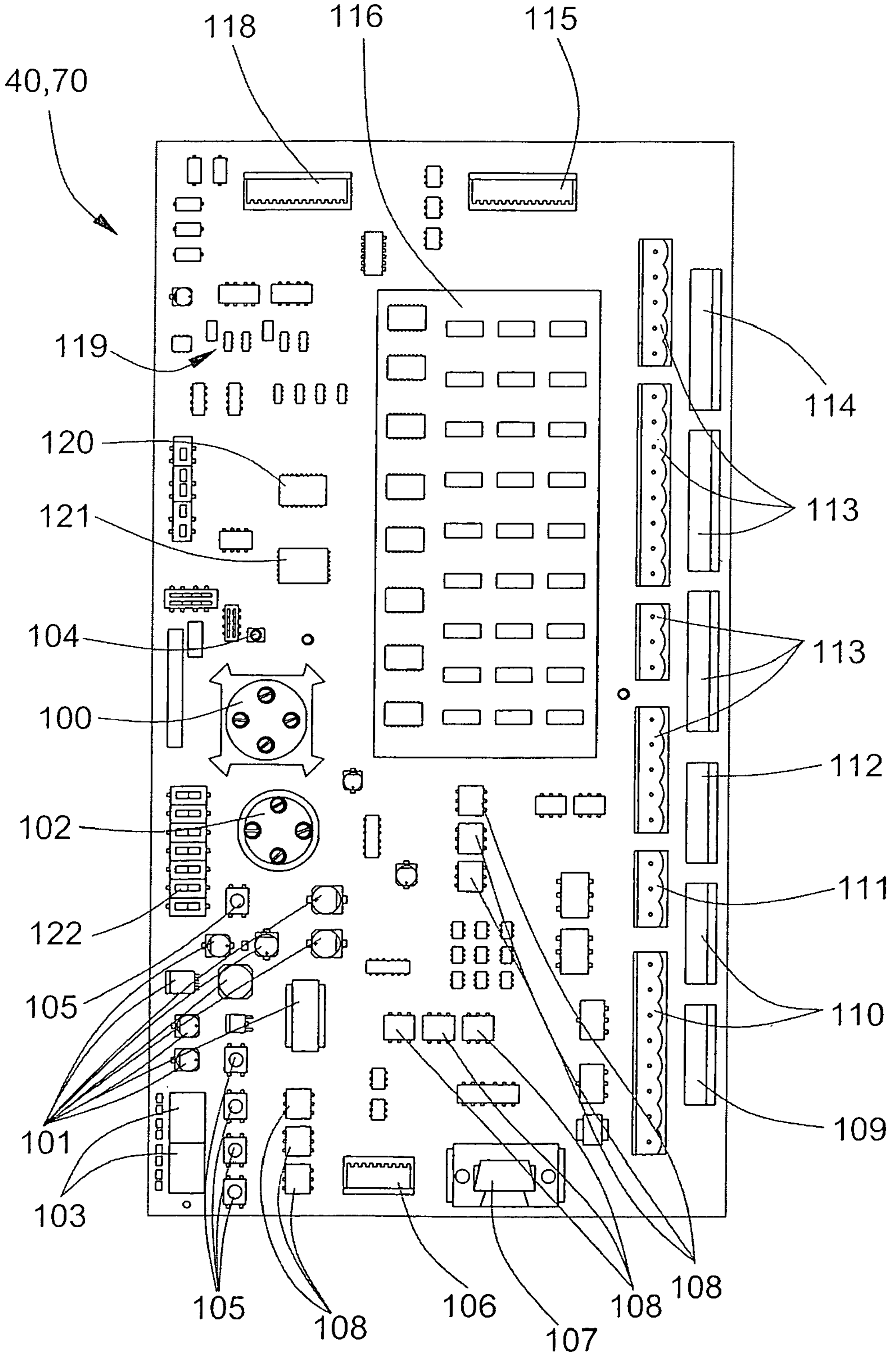
FIG. 2 is a view from above of a printed circuit board of the escalator according to FIG. 1.

As is apparent from FIG. 2, in the exemplary embodiment shown, the two printed circuit boards 40, 70 have a microprocessor 100, an AC adapter 101 that is subdivided into several components, a first optical display unit 103 in the form of an LC display for displaying error messages, and several operating keys 105 that are particularly to be operated in the case of a functional failure of the escalator 1. The microprocessors 100 are of conventional design, and may be configured to monitor travel speed and direction, the safety switches, and braking functions and distances, as well as the generation of braking signals on fault detection and validation signals.

Also present is an RS485 interface 106, for example for a data bus control or a frequency converter, and an RS232 interface 107 for connection of a laptop computer for maintenance purposes.

Optocoupler units 108 serve to provide electrical isolation. There are also a voltage supply connector 109, an output connector 110 for the control and signalization, an input connector 113 for the control, an input connector 112 for monitoring the speed of the band 10, and a connector 111 for exchanging data between the master control unit 60 and the slave control unit 30. An input connector 114 serves to connect a motor temperature sensor. An output 115 serves to connect a digital display. A plurality of components 116 serve the purpose of on/off switching between the microprocessor 100 and particularly the plug connections 109 to 114. An input 118 serves to connect a further temperature sensor. Several components 119 form an amplifier circuit for an A/D converter. Also provided as memory units are a RAM 120 and a flash memory 121. The component's function is interconnected as known in the art.

Serving to set the configuration of the printed circuit boards 40, 70 as master control unit 60 or as slave control unit 30 is a switch 122. A second optical display unit 104 serves to display the configuration of the printed circuit board 40, 70. Sensors for monitoring the speed of travel, the direction of travel, and/or the braking distance of the band 10 of the escalator 1 can also be connected to the interfaces and connections.

It is expressly stated that particularly the embodiment of the printed circuit boards 40, 70 described by reference to FIG. 2 represents only one possible embodiment, and that further embodiments using individual selected components of the printed circuit boards are therefore also conceivable.

We claim:

1. A passenger transportation system, comprising a circulating band, a master control unit, at least one slave control unit, a driving station arranged in the area of a first end of the passenger transportation system, and a reversing station arranged in the area of a second end of the passenger transportation system, the master control unit and the slave control unit being connected together for a purpose of exchanging data via a data bus, the slave control unit having a first printed circuit board that is provided with a first set of electronic components and serves to transmit data concerning the functioning of the passenger transportation system to the master control unit, the master control unit having a second printed circuit board that is provided with a second set of electronic components and serves to analyze the data and control the passenger transportation system, characterized in that the first printed circuit board and the second printed circuit board are identically constructed and each include memory storing identical operating data for the passenger transportation system, the data bus providing for direct transfer of the operating data from one of the printed circuit boards to a new circuit board when installed to replace the other of the circuit boards.

2. A passenger transportation system according to claim 1, further characterized in that the printed circuit boards are provided with a switch and means for allowing each printed circuit board to be configured as a master control unit or as a slave control unit depending on the position of the switch.

3. A passenger transportation system according to claim 1, further characterized in that the printed circuit boards have a first optical display unit to display their configuration as a master control unit or as a slave control unit.

4. A passenger transportation system according to claim 1, further characterized in that the printed circuit boards have a second optical display unit to display data.

5. A passenger transportation system according to claim 1, further characterized in that the printed circuit boards have at least one interface for the connection of a peripheral device.

6. A passenger transportation system according to claim 1, further characterized in that at least one of the slave control unit and the master control unit has means for monitoring at least one of a speed of travel of the circulating band, a direction of travel of the circulating band, a braking distance of the circulating band, and a position of a safety switch.

7. A passenger transportation system according to claim 6, further characterized in that the driving station has a drive unit, the master control unit having means for transmitting a braking signal to the drive unit in accordance with a status of the monitoring means.

8. A passenger transportation system according to claim 1, further characterized in that the driving station has a drive unit, the master and slave control units having means for detecting a fault, the master control unit having means for transmitting a braking signal to the drive unit if the slave control unit or the master control unit detects a fault.

9. A passenger transportation system according to claim 1, further characterized in that the master control unit has means for emitting at predefined time intervals a validating signal to validate the functioning of the data bus.

10. A method for operation and repair of a passenger transportation system comprising a circulating band, a master control unit, at least one slave control unit, a driving station arranged in the area of a first end of the passenger transportation system, and a reversing station arranged in the area of a second end of the passenger transportation system, the master control unit and the slave control unit being connected together for a purpose of exchanging data via a data bus, comprising the steps of:

installing in the slave control unit a first printed circuit board provided with a first set of electronic components and which serves to transmit data concerning the functioning of the passenger transportation system to the master control unit;

installing in the master control unit a second printed circuit board identically constructed to the first circuit board and that is provided with a second set of electronic components and which serves to analyze the data and control the passenger transportation system;

installing in memory in the first and second circuit boards identical operating data for the passenger transportation system; and awaiting the need for replacement of one of the circuit boards, removing the circuit board to be replaced, installing a new circuit board identically constructed to the removed circuit board, and direct transferring across the data bus a copy of operating data from the non-replaced printed circuit boards to the new circuit board.

* * * * *